United States Patent

Legiret et al.

Patent Number: 6,079,229

Date of Patent: Jun. 27, 2000

[54] PROCESS FOR IMPROVING THE THERMAL PROFILE OF GLASS OVENS

[75] Inventors: Thierry Legiret, Toussus le Noble; Bernard Labegorre, Paris; Laurent Rio, Versaillee; Robert Plessier, Marseilles, all of France

[73] Assignee: L'Air Liquide, Societe Anonyme Pour l'Etude et l'Exploitation des Procedes George Claude, Paris, France

[21] Appl. No.: 08/991,654

[22] Filed: Dec. 16, 1997

[30] Foreign Application Priority Data

Dec. 31, 1996 [FR] France ................................ 96 16259

[51] Int. Cl.$^7$ ................................ C03B 5/20; C03B 3/00; C03B 5/16; C03B 5/00

[52] U.S. Cl. ................................ 65/135.9; 431/8; 432/19; 432/195; 65/135.1; 65/136.3; 65/346; 65/347

[58] Field of Search ................................ 432/19, 20, 195, 432/196; 431/8; 65/63, 134.1, 135.1, 136.3, 346, 347, 135.9

[56] References Cited

U.S. PATENT DOCUMENTS

| | | | |
|---|---|---|---|
| 2,800,175 | 7/1957 | Sharp | 159/117.5 |
| 4,473,388 | 9/1984 | Lauwers | 65/134 |
| 4,531,960 | 7/1985 | Desprez . | |
| 4,911,744 | 3/1990 | Petersson et al. | 65/136 |
| 5,116,399 | 5/1992 | Lauwers | 65/135 |
| 5,147,438 | 9/1992 | Castelain et al. | 65/135 |
| 5,242,296 | 9/1993 | Tuson et al. | 431/10 |
| 5,853,448 | 12/1998 | Duchateau et al. | 65/134.4 |
| 5,855,639 | 1/1999 | Ougarane et al. | 65/134.4 |

FOREIGN PATENT DOCUMENTS

94/06724  3/1994  WIPO .

*Primary Examiner*—Stanley S. Silverman
*Assistant Examiner*—Jacqueline A. Ruller
*Attorney, Agent, or Firm*—Burns, Doane, Swecker & Mathis, L.L.P.

[57] ABSTRACT

In a process for manufacturing glass in a furnace a glass charge in solid form is introduced into a furnace-charging zone at an upstream part of a furnace. The glass charge is moved from the furnace-charging zone to a zone for removing the combustion smoke from the furnace downstream from the furnace-charging zone. The glass charge is moved from the zone for removing combustion smoke to a charge-melting zone downstream from the furnace-charging zone and located substantially in a middle of the furnace and heated by at least one burner. The glass charge is moved from the charge-melting zone to a charge-refining zone downstream from the charge-melting zone. The glass charge is brought to a desired temperature and viscosity in the charge-refining zone. The glass charge is removed from the furnace after the glass charge has been brought to the desired temperature and viscosity. The glass charge, after it has been removed from the furnace, is moved into a feed channel of glass-forming machines. Energy is delivered to the glass charge in the furnace-charging zone in an amount between 5% and 40% of a total energy delivered to the glass charge in the furnace. Energy is delivered to the glass charge throughout the entire furnace such that energy delivery is uniformly distributed over an entire length of the furnace so as to avoid exceeding a crown temperature at a hot spot of the furnace of greater than approximately 1620° C., and so as to maintain a temperature in the furnace-charging zone, measured in a crown of the furnace, at least equal to 1430° C.

17 Claims, 4 Drawing Sheets

PROCESS FOR IMPROVING THE THERMAL PROFILE OF GLASS OVENS

BACKGROUND AND SUMMARY

The present invention relates to a process for manufacturing glass in a furnace in which a glass charge in solid form is introduced into the upstream part of the furnace in a so-called furnace-charging zone in which there is also a zone for removing the combustion smoke from the furnace, the furnace also including a charge-melting zone located in the middle of the furnace and heated by means of at least one burner, as well as a charge-refining zone in which the glass is brought to the desired temperature and viscosity before it leaves the furnace and enters a feed channel of glass-forming machines.

In a glass furnace, the charging of a furnace with glass in the solid state is generally carried out on the upstream part of the furnace while the heating of the charge is more carried out in central part or downstream part of the furnace.

It has been observed that, at least in some furnaces, there were cool spots in the crown zone of the furnace, in particular in the region of the upstream part. These cool spots may be characterized by crown temperatures in this upstream part of less than 1430° C., which causes condensation of alkaline products on the refractories of the crown, which condensation is then responsible for degradation of this crown and contamination of the glass bath by refractory residues resulting from the etching of the wall by these alkaline condensation products.

It is known, for example from EP 532,825 and from EP 508,139, to use flames, in particular oxy-fuel flames, which heat the surface of the glass bath in the central zone, or in the downstream zone of the furnace but oriented towards the upstream zone of the furnace, thus allowing this upstream zone to be heated.

The problem encountered with this type of process is that, when the glass bath is heated significantly, hot spots are produced in the crown of the furnace, substantially in the region of the central zone of the latter (generally the hottest spot). If the energy injected by these burners were to be increased, hoping also to increase the crown temperature in the upstream zone, the maximum temperature permitted by the crown would be exceeded and the refractories in this hot-spot zone would be destroyed. It is therefore necessary to accept a compromise which is not satisfactory as a general rule and which leads to an insufficient temperature in the upstream zone.

The invention makes it possible to avoid these drawbacks. It is characterized in that the energy delivered to the glass in the furnace-charging zone is between 5% and 40% of the total energy delivered to the glass in the furnace and in that the energy delivered to the glass is uniformly distributed over the entire length of the said furnace so as to avoid exceeding a crown temperature at the hot spot of the furnace of greater than approximately 1620° C. and preferably approximately 1590° C., so as to maintain a temperature in the furnace-charging zone, measured in the crown, at least equal to 1430° C. and preferably approximately 1480° C.

Preferably, the energy delivered to the glass in the furnace-charging zone is between approximately 20% and approximately 30% of the total energy delivered to the glass in the furnace according to a preferred embodiment of the invention, in which the furnace includes two smoke-removal ducts located more or less facing each other in the side walls of the furnace near the rear wall of the furnace which includes the port for charging the furnace with glass, the energy being brought into the furnace-charging zone by two burners located on each side of the furnace-charging port and preferably placed symmetrically with respect to the furnace-charging port.

These burners will preferably be so-called flat-flame burners (such as those described, for example, in European Application No. 96 401578.8 or 96 401575.4) preferably having a so-called low-momentum flame (i.e. having a flame fluid velocity of less than 100 m/s and preferably of less than 30 m/s) in order to avoid the fly-off of solid material in the furnace (glass powder) which would then attack the refractory walls of the furnace.

According to a preferred variant of the invention, which will preferably be applied in the construction of new furnaces, the smoke-removal chimneys of the furnace will be placed in a staggered fashion, each in one of the side walls of the furnace near the rear wall of the said furnace where the port for charging the furnace with glass is located, the energy being brought into the furnace-charging zone by means of burners placed more or less opposite each removal chimney.

According to another variant, a furnace configuration may also be provided in which, conversely, the charging of the furnace takes place laterally and at least one smoke-removal chimney is located in the rear wall of the furnace, while still maintaining a burner arrangement identical to that described above.

The invention also relates to glass furnaces allowing the processes described above to be implemented.

The furnace-charging zone as defined in the scope of the present invention is substantially the zone lying upstream of the so-called composition line of the furnace, which is a line well known to those skilled in the glassmaking art.

In general, this composition line lies at the downstream limit (with respect to the directional flow of the glass) of the smoke-removal chimneys (or of the furnace-charging zones in the opposite case).

The invention makes it possible to regularize the temperature profile of the crown of glass furnaces and to increase the productivity of these furnaces by optimizing the transfer of energy to the charge, while at the same time avoiding the drawbacks of the known techniques.

The subject of the invention is also a glass furnace, the wall of which includes, in an upstream end part of the furnace, access zones, namely at least one zone for charging the furnace with a charge to be melted and at least one smoke-removal zone, at least one side of the said upstream end part having at least one of the said access zones, in which furnace at least one region provided with an oxy-fuel burner is located in the said upstream end part, between that one of the said access zones which is furthest upstream and the access zone which is most immediately downstream on one of the sides of the said upstream end part.

By virtue of this arrangement, the cool spots of the crown, which are located over the first meters of the latter in the relevant longitudinal direction of the furnace, going from the upstream end to the downstream end, are eliminated and the temperature profile of the crown is appreciably regularized, that is to say that the temperature of the hot spots is not significantly increased.

The result of this is that the lifetime of the crown is increased, because alkaline condensation has been eliminated, and that the undesirable consequences of fly-off are minimized due to the early vitrification of the charge. In addition, the energy is better distributed over the surface of the glass bath (the specific surface area for heating is increased) and the quality is therefore improved, while the productivity of the furnace is increased.

BRIEF DESCRIPTION OF THE DRAWINGS

Other characteristics and advantages of the invention will emerge from the description which follows of embodiments of the invention, these being given by way of non-limiting examples and illustrated by the drawings appended hereto, in which.

DETAILED DESCRIPTION

Figure 1:
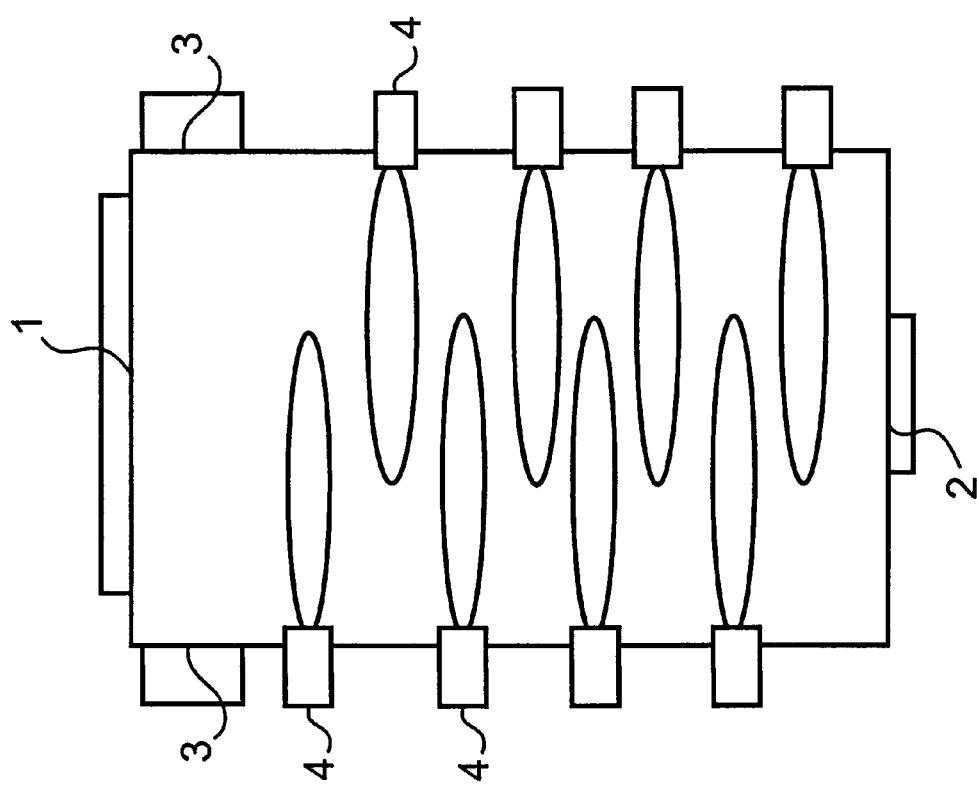
FIG. 1 is a diagrammatic horizontal sectional view of a known all-oxygen glass furnace.

FIG. 1 shows very diagrammatically an all-oxygen furnace in which the arrangement of the oxy-fuel burners is conventional.

This furnace has, in cross-section on a horizontal plane, an approximately rectangular general shape, the short sides of which correspond to the end faces (gable walls) of the furnace and the long sides of which correspond to the side faces of the wall of the furnace.

The charge to be vitrified is introduced through one of the end faces (the upstream end face) which has, for this purpose, one or more furnace-charging zones 1 and the molten glass is removed from the opposite end face (the downstream end face) which has one or more discharge zones 2. The smoke is removed via chimneys placed in the removal zones 3 which in this case are located facing each other in the side faces of the furnace, in the same upstream end part as the furnace-charging zones 1.

Oxy-fuel burners 4 are placed in regions one after the other along the side faces of the furnace, in a staggered configuration and, in this case, at the same level, alternately on one face and the opposite face, in the longitudinal direction of the furnace.

The regions for the burners 4 are all downstream of that upstream end part of the furnace which has the zones 1, 3 for access to the inside of the furnace, via which zones the furnace is charged and the smoke is removed, referring to the direction of flow of the melting or melted glass; the distance between the first burner 4 and the furnace-charging gable wall is therefore relatively large (several meters) and this arrangement contributes to the existence of a cool region in the upstream end part of the crown.

Figure 2:
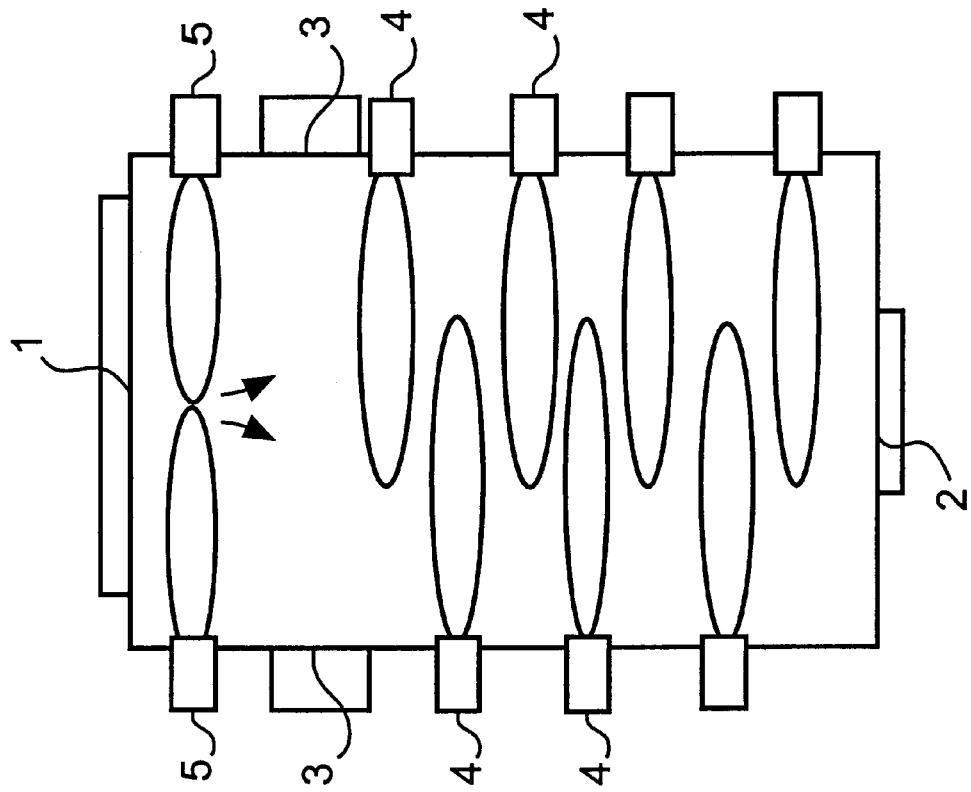
FIGS. 2 to 6 are views, corresponding to that in FIG. 1, of five embodiments of an all-oxygen glass furnace according to the invention.

In FIG. 2 and the following figures, identical elements bear the same reference numbers as in FIG. 1, the furnace shown being of the same type as previously. On the other hand, the relative arrangement of the various access zones and of the burner regions is different.

More specifically, in FIG. 2, the zone or zones 1 for charging the furnace with the charge are also in the gable wall; on the other hand, two oxy-fuel burners 5 are opposite each other on the opposing side faces of the furnace, upstream of the smoke-removal zones 3, i.e. in that end part of the furnace which has these access zones 1, 3, if this end part is defined as being that part of the furnace which extends from the gable wall to the most downstream end of the access zone 1 for charging the furnace or of the zone 3 for removing the smoke. The fact that there is at least one burner 5 in a region lying between a smoke-removal zone 3 and a furnace-charging zone 1 (and in this case two burners 5 in two respective regions) makes it possible to bring the temperature of the crown of the furnace, in this end part of the furnace, down to a value close to those of the other parts of the crown, and thus to achieve the desired objective.

According to another characteristic of the invention, the burners 5 of the end part may be inclined with respect to the gable wall, at least partly, in such a way that their flame is directed appreciably downstream so as to avoid overheating the rider arches of the charges of the furnace-charging zones 1. Preferably, they can be oriented in such a way that the direction of their flame with the perpendicular to the side faces of the furnace defines an acute angle extending downstream.

In addition, the burners 5 may be oriented downwards at a certain angle, in all the variants envisaged.

Figure 3:
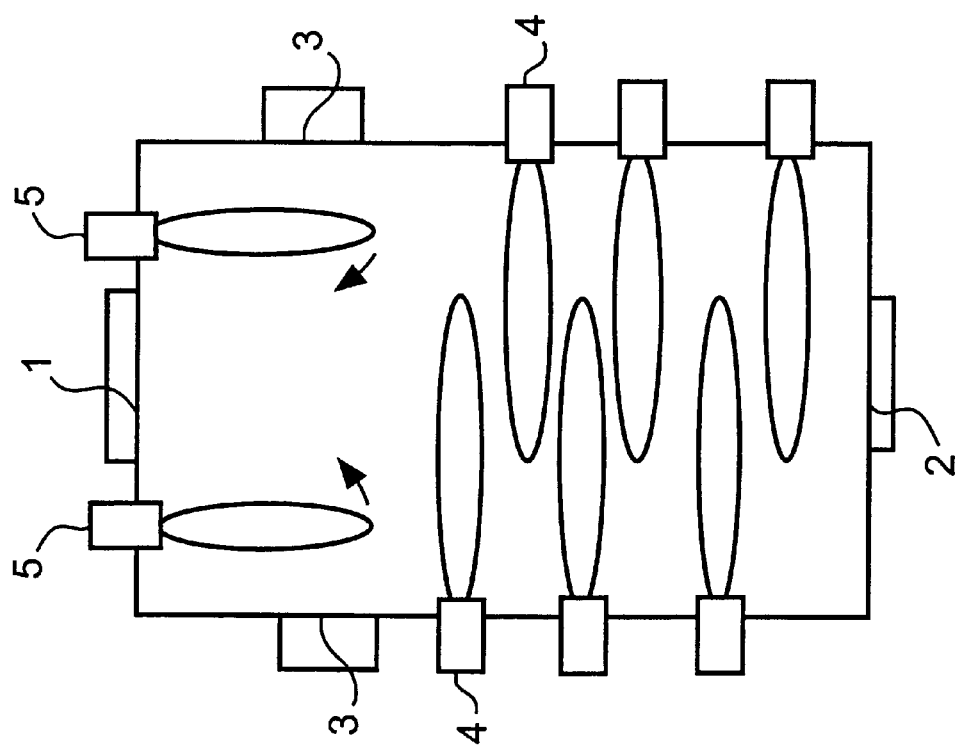

In FIG. 3, the zone or zones 1 for charging the furnace with the charge are again in the gable wall, but oxy-fuel burners 5 (in this case, two oxy-fuel burners) are also placed in the gable wall, on either side of the furnace-charging zones, also upstream of the smoke-removal zones 3, with the same advantages.

These two burners 5 may also be inclined or able to be oriented, but this time in such a way that their flame is directed appreciably towards the central longitudinal vertical plane of the furnace so that the chimneys are further away and their heat is better distributed in the furnace. Preferably, they are therefore able to be oriented in such a way that the direction of their flame with the perpendicular to the gable wall defines an acute angle extending towards the abovedefined central plane.

Figure 4:
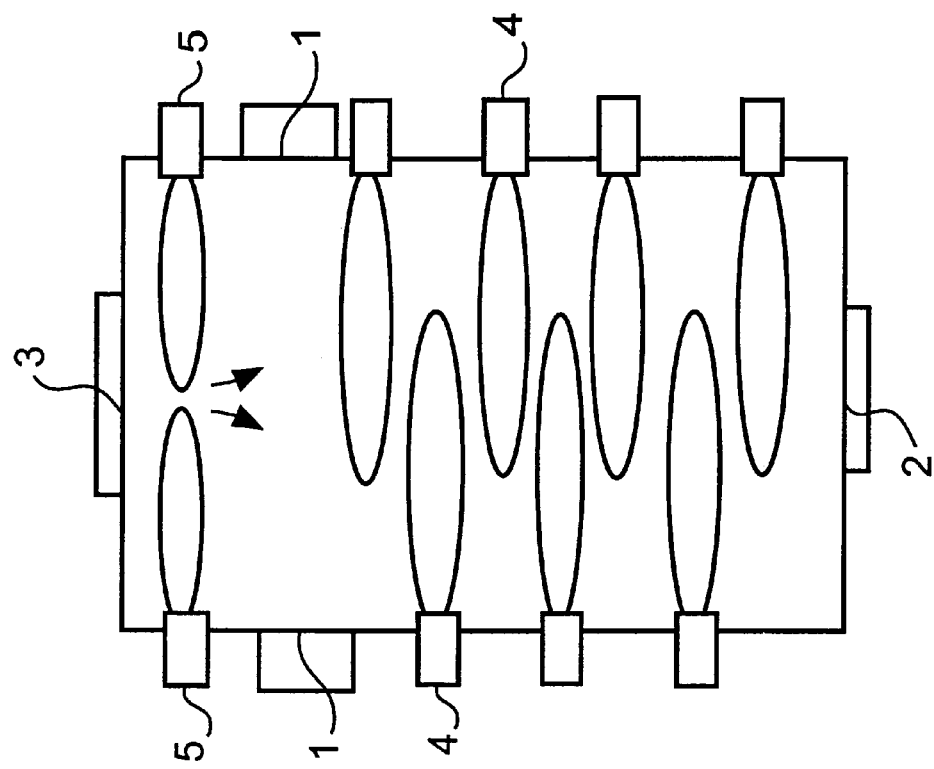

In FIG. 4, the furnace-charging zones 1 and the smoke-removal zone or zones 3 are reversed with respect to FIG. 2. In other words, the smoke-removal zones 3, instead of being located in the side faces as in FIG. 2, are in the gable wall and the furnace-charging zones 1 are in the side faces (at least one zone in each side face); two oxy-fuel burners 5 are facing each other on the opposing side faces of the furnace, upstream of the furnace-charging zones 1, 3, i.e. again in that end part of the furnace which has these access zones 1, 3, in respective regions lying between a smoke-removal zone 3 and a furnace-charging zone 1.

The burners 5 are inclined, or can be oriented, as in the case shown in FIG. 2, towards the downstream end so that their flame is away from the chimneys and their heat is better distributed.

Figure 5:
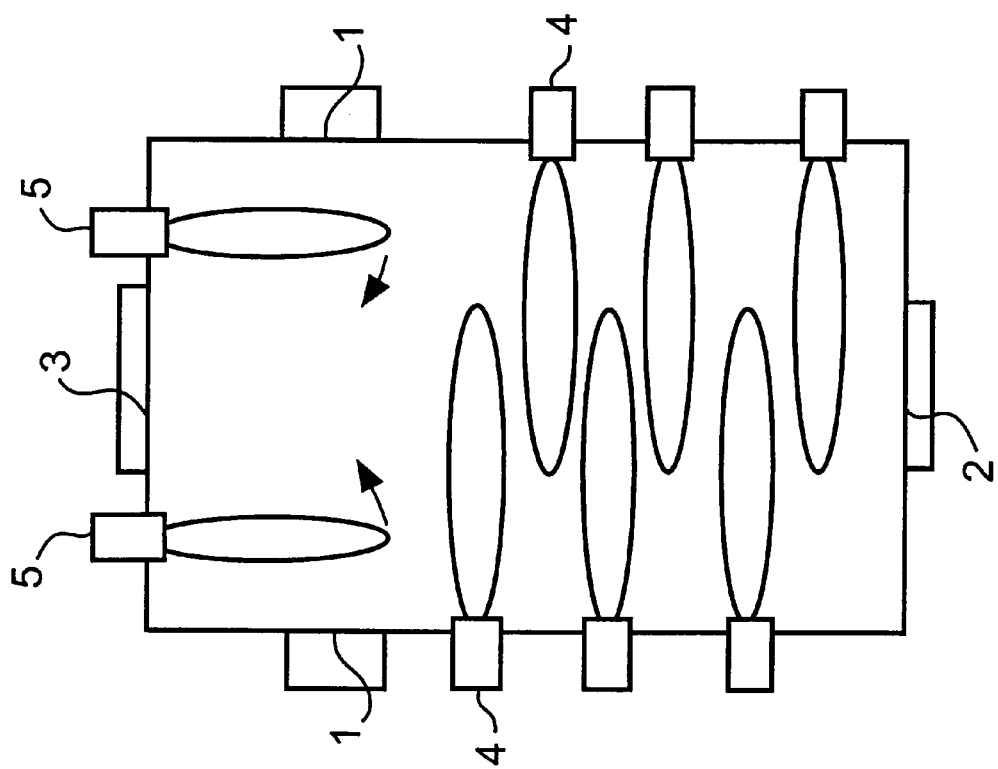

In FIG. 5, the furnace-charging zones 1 and the smoke-removal zones 3 are reversed with respect to FIG. 3. In other words, the smoke-removal zone or zones 3, instead of being located in the side faces as in FIG. 3, are in the gable wall and the furnace-charging zones 1 are in the side faces (at least one zone in each side face); two oxy-fuel burners 5 are also placed in the gable wall, on either side of the smoke-removal zones 3, upstream of the furnace-charging zones 1; the burners 5 are inclined or can be oriented as in the case shown in FIG. 3, so that their flame is away from the rider arches.

Figure 6:
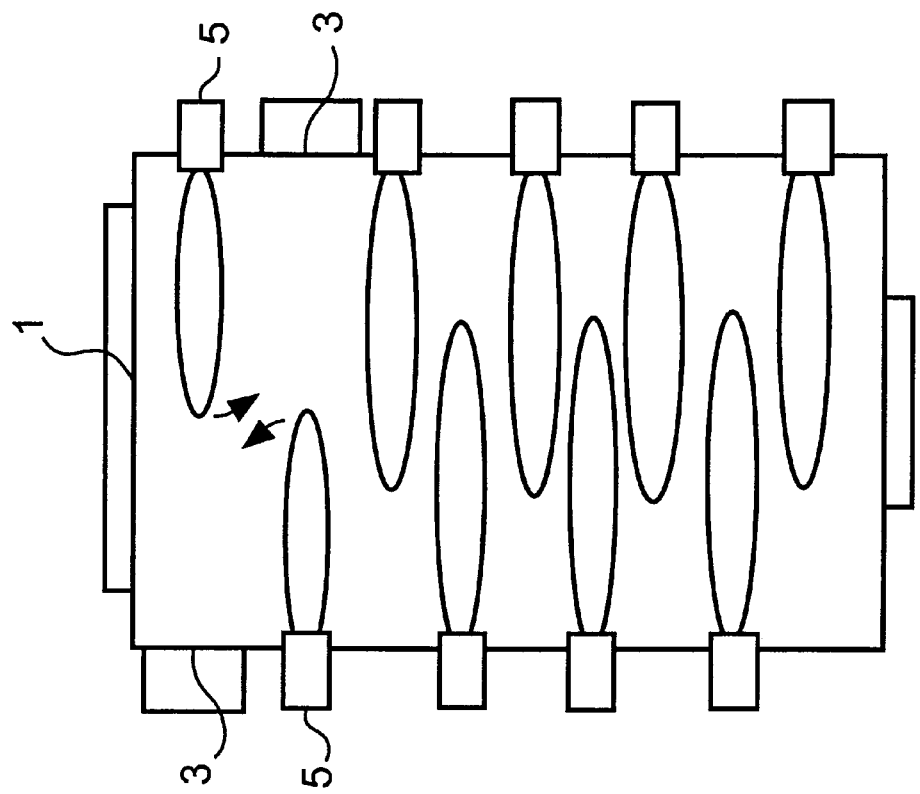

In FIG. 6, the furnace-charging zone or zones 1 are in the gable wall and the smoke-removal zones 3 are in the side faces of the furnace; however, the smoke-removal zones 3 are not in this case placed facing each other but are offset along the longitudinal direction of the furnace, and an oxy-fuel burner 5 faces each smoke-removal zone 3. The regions for the two additional burners 5 are therefore in that end part of the furnace in which the access zones 1, 3 formed by the furnace-charging zones and the smoke-removal zones extend, but only one of the two regions for the burners 5 is upstream of that one of these access zones 1, 3 which is furthest downstream, i.e. between two of these access zones.

The two burners 5 are inclined or can be oriented with respect to the gable wall, the closest to the gable wall in such a way that its flame extends slightly towards the downstream end in order not to damage the rider arches and the furthest away from the gable wall in such a way that its flame extends slightly towards the upstream end for better distribution of the energy delivered by the latter, and also so that it does not approach too closely the chimney lying opposite it.

Of course, other arrangements are possible so that one or more burners 5 are in at least one region of that end part of the furnace in which the access zones 1 for charging the furnace with charge to be melted extend and the access zones 3 for removing the smoke, so as to bring the energy to the charge upstream of the melting zone.

Although the examples described above relate to all-oxygen furnaces, the invention also relates to furnaces with air-fuel burners as well as to hybrid furnaces having both oxy-fuel burners and air-fuel burners.

From a practical standpoint, and more particularly with regard to existing furnaces, the burners 5 may be arranged in some of the inspection holes which extend conventionally along the wall of the furnace and, when these are oxy-fuel burners, they are maintained in continuous operation, for example under stoichiometric conditions.

The precise determination of the characteristics of the flame to be obtained, and thus of the parameters which pertain thereto, must obey a certain number of constraints and, as already mentioned, it is necessary to have good distribution of the energy emitted, without creating hot spots, in particular in the crown, the gable end and the rider arches. For this purpose, it is particularly necessary to monitor the temperature, stability and location of the flames and to avoid interaction of the latter. In addition, the oxygen burners 5 must not lead, in particular by interaction of their flame with the combustion products of the flame from other, in particular air, burners 4, to an increase in the emission of nitrogen oxides.

It will be noted that, in the case of furnaces with conventional air-fuel burners, in which some of the burners are used for combustion and are then stopped, while the remaining burners which face them are used, before these are in turn stopped so that the first burners are used again, and so on, in a general manner, whereby the ducts serving to supply air during the operation of the corresponding burner also serve to remove the smoke when the operation of the burner is stopped. In addition, the smoke-removal zone furthest upstream, which is none other than the zone where the air inlet duct for the furthest upstream oxy-fuel burner emerges, defines with the furnace-charging zone (or the furnace-charging zones) that end part of the furnace in which, according to the invention, the region for the additional burner (or the regions for the additional burners) will be found. In this case, at least one additional oxy-fuel burner is therefore arranged in a region lying upstream of the furthest upstream air-fuel burner zone which acts as the smoke-removal zone of the embodiments in FIGS. 1 to 6 and which, for this reason, bears the same reference number.

Figure 7:
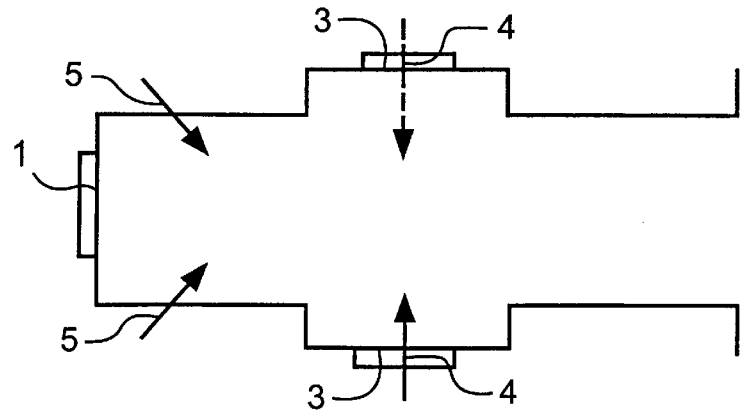
FIGS. 7 and 8 are partial schematic horizontal sectional views of two embodiments of a glass furnace having air-fuel burners according to the invention.

FIG. 7 shows an upstream end part of a furnace having air-fuel burners, with such a burner 4 shown symbolically in operation, the zone lying opposite, in which there is another burner 4 which is not in service, then being used as a smoke-removal zone 3; since a few minutes later the roles of the oxy-fuel burners 4 will be reversed, it will then be the zone of the burner previously in use which will be used as the smoke-removal zone 3. Thus, in this embodiment, the additional oxy-fuel burners 5 are in regions lying upstream of the zones of the two furthest upstream air-fuel burners, in the side faces of the furnace, and the burners 5 are maintained in continuous operation, for example under stoichiometric conditions.

In this type of furnace, according to the invention, it is recommended that the oxy-fuel burners provide from 5 to 10% of the total power of the furnace, that the velocities of the combustion products and/or of the reactants leaving the burner be from 10 to 20 m/s, that the inclination of the burner towards the charge in a vertical plane be from 0 to 15 degrees and that the inclination of the burner towards the downstream end of the furnace in a horizontal plane be from 0 to 30 degrees.

For example, two low-momentum oxy-fuel burners were fitted into a large-capacity (500 tonnes/day; 30 meters×10 meters) cross-fired regenerative furnace for producing flat float glass, these burners being inclined at 18 degrees towards the downstream end of the furnace and having an oxygen flow rate of 400 $Nm^3/h$, a fuel gas flow rate of 220 $Nm^3/h$ and a velocity of the reactants in the burner of approximately 30 m/s. Under these conditions, the draught was able to be increased by 10%, with a significant reduction in the specific consumption, without any modification of the critical temperatures in the furnace, without any reduction in the quality of the glass and without any increase in the emission of nitrogen oxides.

It is possible to further improve the technique described with reference to FIG. 7 by staging the oxygen supply into the flame of the oxy-fuel burner, thereby decreasing the flame temperatures and, under some conditions, improving the heat transfer to the charge.

Figure 8:
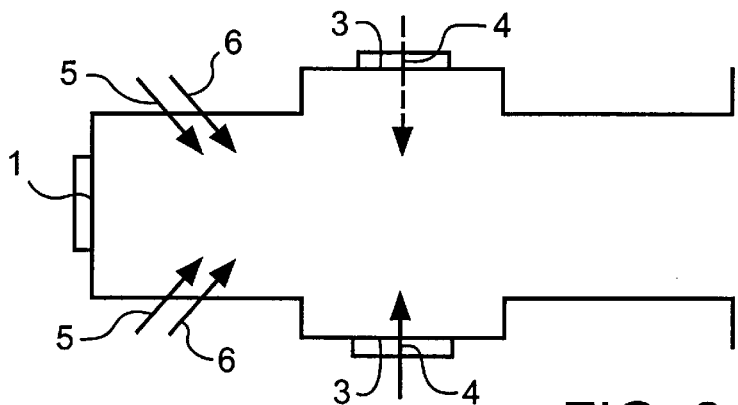

FIG. 8 shows an example of an application of this improvement to the furnace shown partially in FIG. 7. In this embodiment, an oxygen lance 6, which completes the fuel- (in this case, fuel oil-) rich combustion in the burner 5, is placed under each oxy-fuel burner 5 (alongside it in the diagrammatic representation). The operating richness of the burner, defined by . . . (?), is fixed at a value of between 1.2 and 2.2. the oxygen injection velocity in the lance 6 is an important parameter for controlling the mixture of the reactants and consequently the combustion; according to the invention, it is recommended to have a velocity of between 10 and 150 m/s. It is also possible to combine a lance with some of the oxy-fuel burners and not with the others. It is also possible and advantageous to use two burner+lance devices, making the burners operate alternately so as to follow the inversion cycles of the furnace; this variant makes it possible to increase the maximum power significantly without reaching critical temperatures for the superstructures of the furnace; thus, for each phase between two inversions, only the burner 5 placed on the air-flame side is in operation, while the two lances 6 (one on each side of the furnace) deliver the oxygen necessary for completing the combustion in the fuel-rich flame at the oxygen burner. The operating richness of the burner is also between 1.2 and 2.2 and the distribution of the complementary oxygen flow rate between the root and the tip of the flame is, in this case, between 20/80 and 60/40%, while the oxygen injection velocity in the lances is from approximately 10 to 150 m/s.

Figure 9:
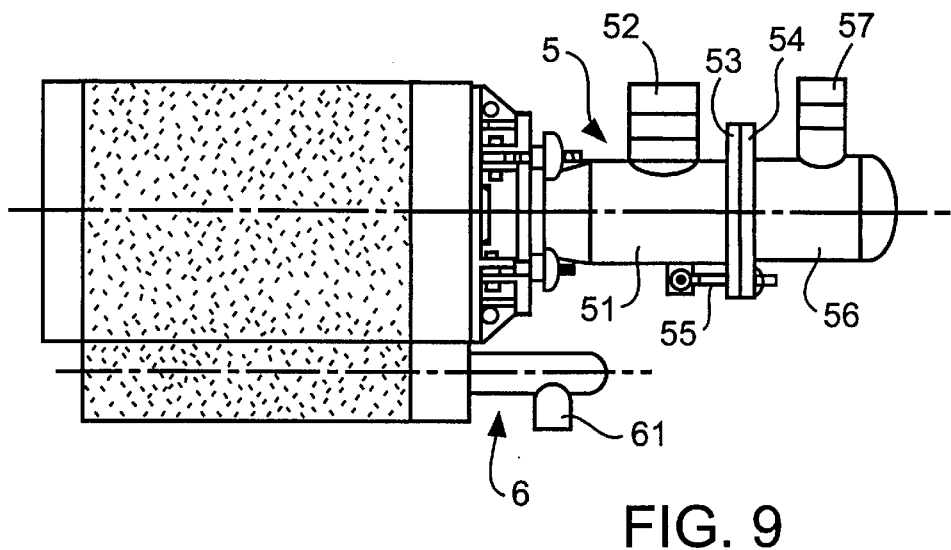
FIG. 9 is a diagrammatic side view of an assembly consisting of an oxy-fuel burner and an oxygen lance, suitable for equipping, in particular, the embodiment in FIG. 8.

FIG. 9 shows, in an oxy-fuel burner/oxygen lance assembly, the superposition of these two devices. The burner 5, having concentric oxygen and fuel ducts, includes a module 51 having an inlet 52 for the oxygen, this module 51 being assembled, by flanges 53, 54 and fixing means 55, to a module 56 which has an inlet 57 for the fuel; the oxygen lance 6 is based alongside and fixed under the oxy-fuel burner 5 and provided, as each of the two modules of the burner, with a side inlet 61 for the oxygen, while the longitudinal axes of the burner 5 and the lance 6 are, in this case, parallel.

The embodiments described relate to burners 5 in which the fuel may be fuel oil, or any other suitable fuel.

In accordance with the current terminology, oxy-fuel burner is understood to mean a burner in which the gas combined with the fuel is appreciably richer in oxygen than air, for example a gas having at least 40%, and preferably at least 50%, of oxygen, for example a mixture of air and oxygen.

What is claimed is:

1. A process for manufacturing glass in a furnace comprising the steps of:
    introducing a glass charge in solid form into a furnace-charging zone at an upstream part of a furnace;
    moving the glass charge from the furnace-charging zone to a zone for removing the combustion smoke from the furnace downstream from the furnace-charging zone;
    moving the glass charge from zone for removing combustion smoke to a charge-melting zone downstream from the furnace-charging zone and located substantially in a middle of the furnace and heated by means of at least one burner;
    moving the glass charge from the charge-melting zone to a charge-refining zone downstream from the charge-melting zone;
    bringing the glass charge to a desired temperature and viscosity in the charge-refining zone;
    removing the glass charge from the furnace after the glass charge has been brought to the desired temperature and viscosity;
    moving the glass charge, after it has been removed from the furnace, into a feed channel of glass-forming machines;
    delivering energy to the glass charge in the furnace-charging zone in an amount between 5% and 40% of a total energy delivered to the glass charge in the furnace; and
    delivering energy to the glass charge throughout the entire furnace such that energy delivery is uniformly distributed over an entire length of the furnace so as to avoid exceeding a crown temperature at a hot spot of the furnace of greater than approximately 1620° C., and so as to maintain a temperature in the furnace-charging zone, measured in a crown of the furnace, at least equal to 1430° C.

2. The process according to claim 1, wherein the energy delivered to the glass charge in the furnace-charging zone is between approximately 20% and approximately 30% of the total energy delivered to the glass charge in the furnace.

3. A process according to claim 1, wherein smoke is removed from the furnace in the zone for removing combustion smoke through smoke-removal ducts arranged such that the two smoke-removal ducts substantially face each other in side walls of the furnace proximate a rear wall of the furnace in which a port for charging the furnace with the glass charge is provided, and comprising the further step of bringing energy into the furnace-charging zone with burners located on each side of the furnace-charging port.

4. A process according to claim 3, wherein the burners for bringing energy into the furnace-charging zone are arranged substantially symmetrically with respect to the furnace-charging port.

5. A process according to claim 3, wherein the burners for bringing energy into the furnace-charging zone are flat-flame burners.

6. A process according to claim 1, wherein the zone for removing combustion smoke includes smoke-removal chimneys placed in a staggered fashion, each smoke-removal chimney being disposed in a side wall of the furnace proximate a rear wall of the furnace where a port for charging the furnace with the glass charge is located, and comprising the further step of bringing energy into the furnace-charging zone by means of burners placed substantially opposite each smoke-removal chimney.

7. A process according to claim 6, wherein the burners placed substantially opposite each smoke-removal chimney are low-momentum burners.

8. A process for manufacturing glass in a furnace comprising the steps of:
    introducing a glass charge in solid form into a furnace-charging zone at an upstream part of a furnace;
    removing combustion gases from the furnace in a zone for removing the combustion smoke from the furnace upstream from the furnace-charging zone, combustion gases being removed from the furnace in the zone for removing combustion smoke through a smoke-removal duct proximate a rear wall of the furnace, and the glass charge being introduced in the furnace-charging zone downstream from the zone for removing combustion smoke through ports in the furnace arranged in a wall of the furnace such that the ports substantially face each other;
    moving the glass charge from the furnace-charging zone to a charge-melting zone downstream from the furnace-charging zone and located substantially in a middle of the furnace and heated by means of at least one burner;
    moving the glass charge from the charge-melting zone to a charge-refining zone downstream from the charge-melting zone;
    bringing the glass charge to a desired temperature and viscosity in the charge-refining zone;
    removing the glass charge from the furnace after the glass charge has been brought to the desired temperature and viscosity;
    moving the glass charge, after it has been removed from the furnace, into a feed channel of glass-forming machines;
    delivering energy to the glass charge in the furnace-charging zone in an amount between 5% and 40% of a total energy delivered to the glass charge in the furnace; and
    delivering energy to the glass charge throughout the entire furnace such that energy delivery is uniformly distributed over an entire length of the furnace so as to avoid exceeding a crown temperature at a hot spot of the furnace of greater than approximately 1620° C., and so as to maintain a temperature in the furnace-charging zone, measured in a crown of the furnace, at least equal to 1430° C.

9. A process according to claim 8, comprising the further step of bringing energy into the furnace-charging zone with burners located on each side of the smoke removal duct.

10. The process according to claim 9, wherein two burners bring energy into the furnace-charging zone.

11. A process according to claim 2, wherein combustion gas is removed in the zone for removing combustion smoke through two smoke-removal ducts.

12. A process according to claim 2, wherein combustion gas is removed from the furnace in the zone for removing combustion smoke through smoke-removal ducts arranged such that the smoke-removal ducts substantially face each other in side walls of the furnace proximate a rear wall of the furnace in which a port for charging the furnace with the glass charge is provided, and comprising the further step of bringing energy into the furnace-charging zone with burners located on each side of the furnace-charging port.

13. A process according to claim 12, wherein the burners for bringing energy into the furnace-charging zone are arranged substantially symmetrically with respect to the furnace-charging port.

14. A process according to claim 12, wherein the burners for bringing energy into the furnace-charging zone are flat-flame burners.

15. A process according to claim 13, wherein the burners for bringing energy into the furnace-charging zone are flat-flame burners.

16. A process according to claim 2, wherein the zone for removing combustion smoke includes smoke-removal chimneys placed in a staggered fashion, each smoke-removal chimney being disposed in a side wall of the furnace proximate a rear wall of the furnace where a port for charging the furnace with the glass charge is located, and comprising the further step of bringing energy into the furnace-charging zone by means of burners placed substantially opposite each smoke-removal chimney.

17. A process according to claim 16, wherein the burners placed substantially opposite each smoke-removal chimney are low-momentum burners.

* * * * *